(12) United States Patent
Boeck et al.

(10) Patent No.: US 12,116,022 B2
(45) Date of Patent: Oct. 15, 2024

(54) AIR-CONDITIONING SYSTEM FOR A RAIL VEHICLE (HAVING AIR-TIGHT OR PRESSURE-TIGHT DUCTING IN THE AIR TREATMENT SECTION)

(71) Applicant: Faiveley Transport Leipzig GmbH, Schkeuditz (DE)

(72) Inventors: Lutz Boeck, Schkeuditz (DE); Steffen Poser, Krostitz (DE); Erik Hoffmann, Borsdorf (DE); Kai Fischer, Leipzig (DE)

(73) Assignee: Faiveley Transport Leipzig GmbH, Schkeuditz (DE)

( * ) Notice: Subject to any disclaimer, the term of this patent is extended or adjusted under 35 U.S.C. 154(b) by 167 days.

(21) Appl. No.: 17/599,074

(22) PCT Filed: Aug. 18, 2020

(86) PCT No.: PCT/DE2020/100718
§ 371 (c)(1),
(2) Date: Sep. 28, 2021

(87) PCT Pub. No.: WO2021/037309
PCT Pub. Date: Mar. 4, 2021

(65) Prior Publication Data
US 2022/0177013 A1 Jun. 9, 2022

(30) Foreign Application Priority Data
Aug. 27, 2019 (DE) ...................... 20 2019 104 698.8

(51) Int. Cl.
*B61D 27/00* (2006.01)
(52) U.S. Cl.
CPC ................ *B61D 27/0018* (2013.01)

(58) Field of Classification Search
CPC ........................ B61D 27/0018; Y02T 30/00
(Continued)

(56) References Cited

U.S. PATENT DOCUMENTS

| | | | |
|---|---|---|---|
| 5,462,481 A | * | 10/1995 | Riedel ............... B61D 27/0018 454/70 |
| 5,605,055 A | | 2/1997 | Salgado |
| 2002/0121102 A1 | | 9/2002 | Kamuf |

FOREIGN PATENT DOCUMENTS

| | | |
|---|---|---|
| DE | 19522099 A1 | 1/1997 |
| DE | 102013011600 B3 | 10/2014 |

(Continued)

OTHER PUBLICATIONS

International Search Report for priority application PCT/DE2020/100718, dated Nov. 6, 2020.
(Continued)

*Primary Examiner* — Steve S Tanenbaum
(74) *Attorney, Agent, or Firm* — K&L Gates LLP (57) ABSTRACT

An air-conditioning system for a vehicle suitable for flammable refrigerants of categories A2, A2L, and A3 is provided. The system is a compact piece of equipment for installation on a vehicle roof and has equipment sections for air treatment and a compressor-liquefier unit, and optionally an outgoing air, an electrical switchbox, and/or silencer. The system is a direct evaporating system in which the air to be conditioned for a passenger area is sealed off within the air-conditioning system such that, in the event of leaks at refrigerant-conducting assemblies, ingress of flammable refrigerant into the interior of the vehicle is prevented. The refrigerant-conducting assemblies and components are located outside the areas where comfort air is conducted, in a separate housing and open to the surroundings.

14 Claims, 6 Drawing Sheets

(58) Field of Classification Search
USPC .......................................................... 62/419
See application file for complete search history.

(56) References Cited

FOREIGN PATENT DOCUMENTS

| EP | 1010599 A1 | | 6/2000 | |
|----|------------|---|--------|---|
| JP | 2012136159 A | * | 7/2012 | |
| KR | 100723930 B1 | | 6/2007 | |
| WO | 2002024478 A1 | | 3/2002 | |
| WO | WO-2013037335 A1 | * | 3/2013 | ......... B60H 1/00371 |
| WO | 2018137908 A1 | | 8/2018 | |

OTHER PUBLICATIONS

Written Opinion on Patentability for priority application PCT/DE2020/100718.
Second Office Action for corresponding AU Patent Application No. 2020339069 dated Mar. 23, 2023 (3 pages).
Office Action for corresponding Eurasian Patent Application No. 202192487 dated Nov. 22, 2022 (6 pages).
Office Action for corresponding EA Application No. 202192487 dated Nov. 22, 2022. English translation provided (6 pages).
Office Action for corresponding KR Application No. 1020217035179 dated Oct. 6, 2023 (5 pages).
First Examination Report mailed Jan. 9, 2023 for corresponding Australian Patent Application 2020339069 (5 pages).
1 Office Action for corresponding JP Application No. 2021-559292 dated Dec. 28, 2022 (5 pages).
International Preliminary Report on Patentability mailed Mar. 10, 2022 for priority application PCT/DE2020/100718 (9 pages).
English translation of the International Preliminary Report on Patentability mailed Mar. 10, 2022 for priority application PCT/DE2020/100718 (9 pages).
First Examination Report mailed Apr. 1, 2022 for corresponding Indian Patent Application No. 202117045561 (6 pages).
Notice of Requisition for corresponding CA Application No. 3,136,515 dated Jan. 24, 2023 (4 pages).
Office Action for corresponding JP Application No. 2021-559292 dated Oct. 3, 2022 (5 pages).

* cited by examiner

AIR-CONDITIONING SYSTEM FOR A RAIL VEHICLE (HAVING AIR-TIGHT OR PRESSURE-TIGHT DUCTING IN THE AIR TREATMENT SECTION)

CROSS-REFERENCE TO RELATED APPLICATIONS

This application is a national phase entry of International Patent Application No. PCT/DE2020/100718 (filed 18 Aug. 2020), which claims priority to German Patent Application No. 20 2019 104 698.8 (filed 27 Aug. 2019). The entire disclosures of these applications are incorporated herein by reference.

BACKGROUND

Technical Field

The subject matter described herein relates to an air-conditioning system for a rail vehicle, where the air-conditioning system is suitable for flammable refrigerants and is designed in the form of a compact piece of equipment for installation on a vehicle roof and at least has equipment sections for air treatment and a compressor-liquefier unit and optionally outgoing air equipment sections, an electrical switch box, and/or silencer.

State of Art

Various refrigerants are known for air-conditioning systems in vehicles, where the use of synthetic refrigerants is, in particular, problematic from an ecological point of view. For this reason, the refrigerant R134a has been used very extensively for motor vehicles and also for rail vehicles. However, this refrigerant acts as a greenhouse gas when the refrigerant escapes into the atmosphere. Therefore, the use of refrigerant R134a for new passenger cars in the European Union was terminated on 1 Jan. 2017.

As an alternative to R134a, refrigerant R1234yf is now predominantly used, which has a much lower greenhouse effect, but is flammable and classified as an A2L refrigerant. However, even the use of this refrigerant is now being criticized by experts. For example, highly toxic hydrofluoric acid (HF) is formed when released in conjunction with temperatures >250° C., and persistent trifluoroacetic acid (TFA) is formed in the atmosphere as a degradation product, which accumulates, in particular, in water. Due to the associated risks, the use of HFO refrigerants such as R1234yf is also being abandoned as a matter of principle.

An alternative to this is the use of carbon dioxide (R744) as a natural refrigerant. However, the use of R744 results in relatively complex equipment technology due to the required high system pressures compared to other refrigerants. Moreover, at high ambient temperatures, there is a significant deterioration in the coefficient of performance (COP) and therefore a significant increase in energy demand for air-conditioning. In addition, there is a sharp reduction in refrigeration capacity as ambient temperatures rise, which can be countered by appropriately larger component sizing.

It is thus evident that the refrigerants used to date ultimately represent a compromise between different functional, environmental and safety requirements. There is a need for the use of refrigerants for vehicle air-conditioning systems, in particular also for rail vehicles, which are ecologically uncritical when emitted to the atmosphere, exhibit high energy efficiency over the entire operating range, and can continue to utilize the knowledge and experience of the cold vapor technology used to date. In the case of rail vehicles, these units are mainly designed as compact units for the vehicle roof. Regardless of the specific design, such compact air-conditioning units typically comprise the air treatment and compressor-liquefier unit sections and can optionally include outgoing air equipment, electrical switch box, and/or silencer sections.

As a solution to the requirements described above, flammable hydrocarbons such as propane (R290), propylene (R1270), or isobutane (R600a) are of interest as alternative refrigerants. These refrigerants are widely used in direct expansion systems with limited charge quantities (<150 g or <500 g), in particular in stationary applications. If larger charge quantities are required to generate higher cooling capacities, indirect systems are preferred due to the flammability of these direct expansion systems.

For air-conditioning of rail vehicles, flammable refrigerants have, to date hardly been used—neither as a direct nor as an indirect evaporating system, this due to the explosion and fire dangers associated with the refrigerants. The above-mentioned risk is reduced in an indirect evaporating system, by designing the air-conditioning system with secondary circuit systems. In this case, the required cooling (or heating) power is provided in a primary circuit using flammable refrigerants in conventional compression refrigeration circuits, which primary circuit is located outside the vehicle and thus has no direct connection to the vehicle interior. This cooling power is transferred by heat exchangers (preferably plate heat exchangers) to a secondary circuit, which is designed, for example, as a brine circuit with water-glycol mixtures.

A technical solution of this type is known from WO 2018/137 908 A1. According to this document, a rail vehicle has a primary refrigerant circuit that is arranged outside the vehicle and is structurally completely separated from the passenger compartment. A secondary refrigerant circuit is arranged at least partially inside the rail vehicle. Heat exchange between the primary refrigerant circuit and the secondary refrigerant circuit takes place via an intermediate heat exchanger arranged under the floor in the exterior area. As a result, the primary refrigerant circuit is routed completely outside the interior of the rail vehicle. This design means that when using flammable substances, the safety considerations to be taken into account substantially involve the outside area, whereas the interior area can be assumed to be as secure as conventional systems. This means that it is also possible to use refrigerants which, for safety-related reasons, have hardly been used to date for the air-conditioning of passenger compartments. For this reason, WO 2018/137 908 A1 proposes the use of flammable refrigerants such as propane, which is well suited as a refrigerant from a functional point of view but has hardly been used to date due to the problems of fire and explosion dangers elucidated above.

Taking into account the state of the art according to WO 2018/137 908 A1 and similar proposed solutions, it can be expected that the acceptance of using flammable refrigerants in air-conditioning systems for rail vehicles will greatly increase in the medium term. It is however to be noted that the indirect circuit will still result in energy use disadvantages due to thermal losses in the intermediate heat exchanger, as well as additional weight and the need for additional installation space. Therefore, for the extensive use of flammable refrigerants, there are aspirations for a direct evaporating system, a system which avoids these disadvantages. In order to be able to guarantee fire and explosion protection with a high level of safety, including in the event of possible operational malfunctions, further structural measures may therefore eventually be necessary on the air-conditioning systems of rail vehicles, which lead to specific designs of various assemblies.

A relevant solution approach is known from DE 195 22 099 A1, which describes an arrangement of fans and other components in pressure-tight chambers. Furthermore, DE 93 19 874 U1 proposes that several assemblies in the refrigeration circuit of an air-conditioning system be fully hermetically sealed in a pressure-tight structure to prevent uncontrolled leaks of refrigerant. This approach is inherently of interest to those persons skilled in the art. However, neither of the printed papers provides any suggestion as to how the abstract idea can concretely be implemented. Moreover, they are not suitable in the form described for flammable refrigerants.

BRIEF SUMMARY

The task of the inventive subject matter is to implement a direct evaporation system in which the air to be conditioned for the passenger area is sealed off within the air-conditioning system in such a way that, in the event of leakage at refrigerant-carrying assemblies, the entry of flammable refrigerant into the interior of the vehicle is precluded.

This task is solved inasmuch as the refrigerant-carrying assemblies and components are arranged outside the areas of the comfort ventilation ducting, in a separate housing and open to the environment. Accordingly, the components of the air handler, such as, for example, mixed air flaps for outside air/ambient air, air filters, flaps, supply-air fan, evaporator and heating register, as well as their interfaces to the outside air inlet and/or to the ambient air inlet and to the blowing in of supply-air, are arranged inside an air-tight and/or pressure-tight ducting in the housing of the compact unit or alternatively in an air-conditioning system designed in this manner. All components outside the ducting are designed to be open to the environment, so that any eventual leakage that may occur is vented or discharged to the outside.

Thus, the comfort ventilation ducting, i.e., the air to be supplied to the passengers in the vehicle, is separated in the device and hermetically sealed from the refrigeration circuit, where the refrigerant-technical parts are designed as a traditional and known hermetic refrigeration circuit. Consequently, one point of novelty compared to the known prior art is that all refrigerant-carrying parts are located outside the comfort ventilation ducting and are arranged in a housing so that they are protected against damage or accidental access. In so doing, the refrigerant-carrying parts are arranged open to the environment in order to discharge any leakage to the outside by means of passive ventilation and to prevent ignitable concentrations over a longer period of time. As long as no potential ignition sources are present, the refrigerant-carrying parts can also be arranged in a separate closed, non-air-tight area. Furthermore, to prevent the ingress of refrigerant in the area of the comfort ventilation ducting, an appropriate seal (technical seal) is made between the two areas of comfort ventilation ducting and housing with refrigerant-carrying components. Further advantageous embodiments are the subject of subclaims, the technical features of which are described in an embodiment example.

With the technical solution according to the inventive subject matter, the subassemblies of an air-conditioning system for a rail vehicle, which are essential for air treatment, are sealed off in such a way that contact of these subassemblies with flammable refrigerants resulting from leakage is prevented by air-tight and/or pressure-tight ducting design. In so doing, acceptance of the use of flammable refrigerants in air-conditioning systems for rail vehicles increases. This, inasmuch as it is now possible to ensure protection from fire and explosion for the interior area, even in the event of an uncontrolled escape of the flammable refrigerant in the exterior area.

BRIEF DESCRIPTION OF THE DRAWINGS

In the following, an embodiment example of the inventive subject matter is explained in more detail with reference to the drawings.

DETAILED DESCRIPTION

Figure 1:
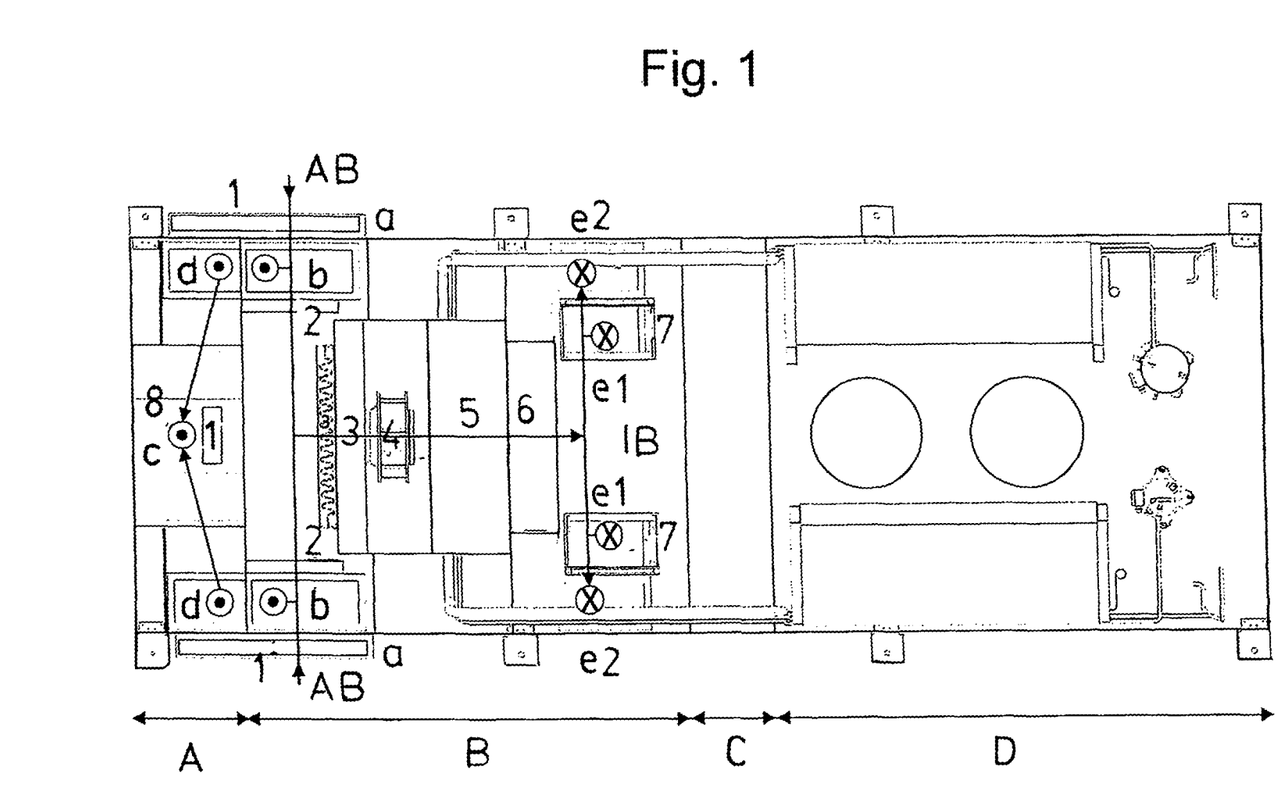
FIG. 1 shows a stylized representation of the basic structure of an air-conditioning system for a rail vehicle, which is suitable for flammable refrigerants and is designed in the form of a compact piece of equipment for installation on the vehicle roof, here without representation of the housing of the air-conditioning system.

FIG. 1 shows the basic structure of an air-conditioning system for a rail vehicle (not shown), which is suitable for flammable refrigerants of categories A2, A2L and A3 and is designed in the form of a compact piece of equipment for installation on the rail vehicle roof. Only the main components for the air treatment are hereby shown, without the housing of the air-conditioning system. Accordingly, the air-conditioning system has an optional equipment section A for outgoing air, an equipment section B for air treatment, an optional electrical switch box C, and a compressor-liquefier unit D. Sections B and A may include, as essential components, pressure wave valves 1, mixed air flaps 2 for outside air/ambient air, air filter 3, supply-air fan 4, evaporator 5, heating register 6, supply-air flaps 7, and exhaust fan 8 as shown. Furthermore, interfaces are provided for fresh air intake a, ambient air intake b, outgoing air opening c, outgoing air intake d, supply-air discharge e1 and supply-air discharge e2.

Figure 2:
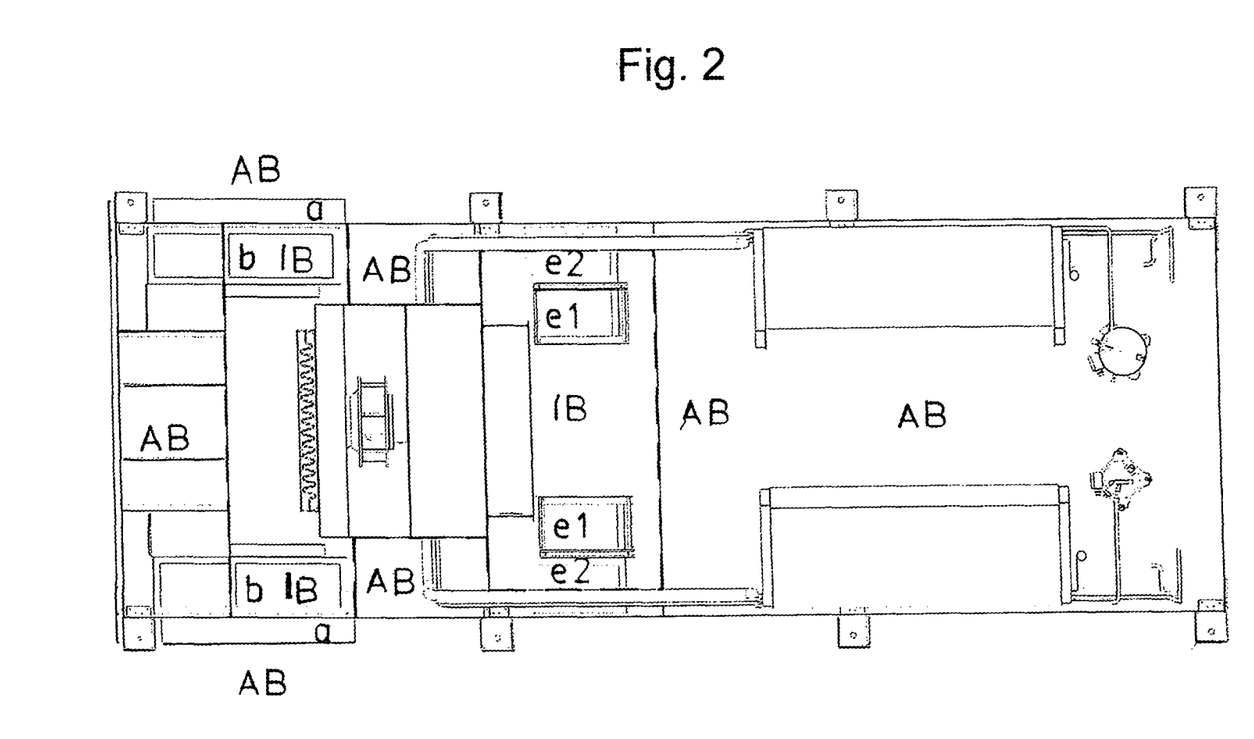
FIG. 2 shows a stylized representation of a first embodiment for arranging assemblies of the air-conditioning system within air-tight ducting.

FIG. 2 shows an arrangement of several of the assemblies shown in FIG. 1 within air-tight ducting in the housing of the air-conditioning system. This air-tight ducting is stylized with a somewhat more heavily drawn and interrupted line contour. Accordingly, the mixed air flaps 2 for outside air/ambient air, air filter 3, supply-air flaps 7, supply-air fan 4, evaporator 5 and heating register 6 of the equipment section B for air treatment as well as their interfaces to the outside air intake a and/or to the ambient air intake b and to the supply-air blow-out e1 and/or e2 are arranged within the air-tight ducting in the housing of the air-conditioning system, which air-conditioning system is designed in the form of a compact piece of equipment. In this regard, the reference sign AB denotes the outer environment as viewed from the ducting and the reference sign IB denotes the inner air treatment area as viewed from the ducting, wherein the area AB is open to the environment and potential leakage is vented or discharged to the outside and IB represents the secure inner area in which no leakage is expected inasmuch as the evaporator is designed as a secure evaporator.

Figure 3:
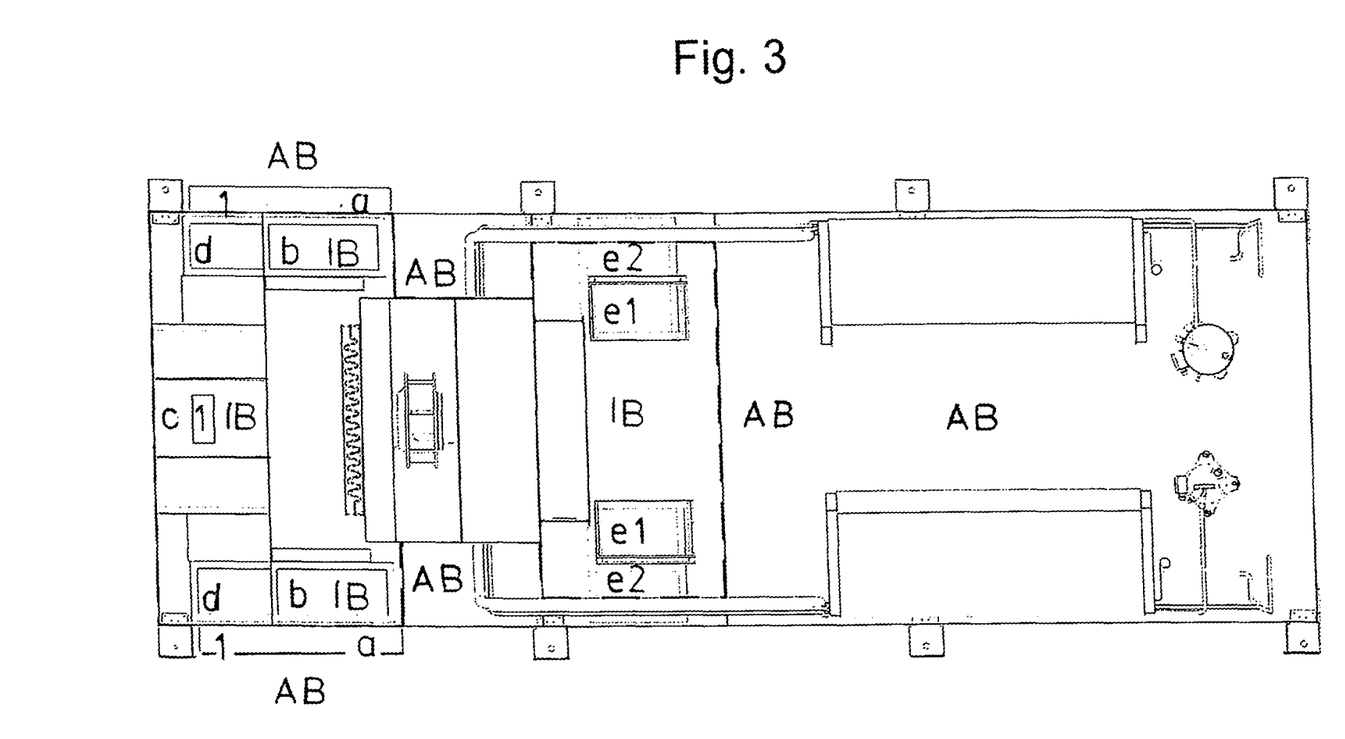
FIG. 3 shows a stylized representation of a second embodiment for arranging assemblies of the air-conditioning system within pressure-tight ducting.

FIG. 3 shows a modified design of the arrangement shown in FIG. 2. In this variant, the equipment section A for the outgoing air with the pressure wave valve 1 and its interfaces to the outgoing air intake d and to the outgoing air opening c is also arranged within a pressure-tight ducting in the housing of the air-conditioning unit. Here, too, the pressure-tight ducting is stylized with a somewhat more strongly drawn and interrupted line contour. Likewise, the reference sign AB denotes the outer environment as seen from the ducting, and the reference sign IB denotes the inner air treatment area as seen from the ducting.

Figure 4:
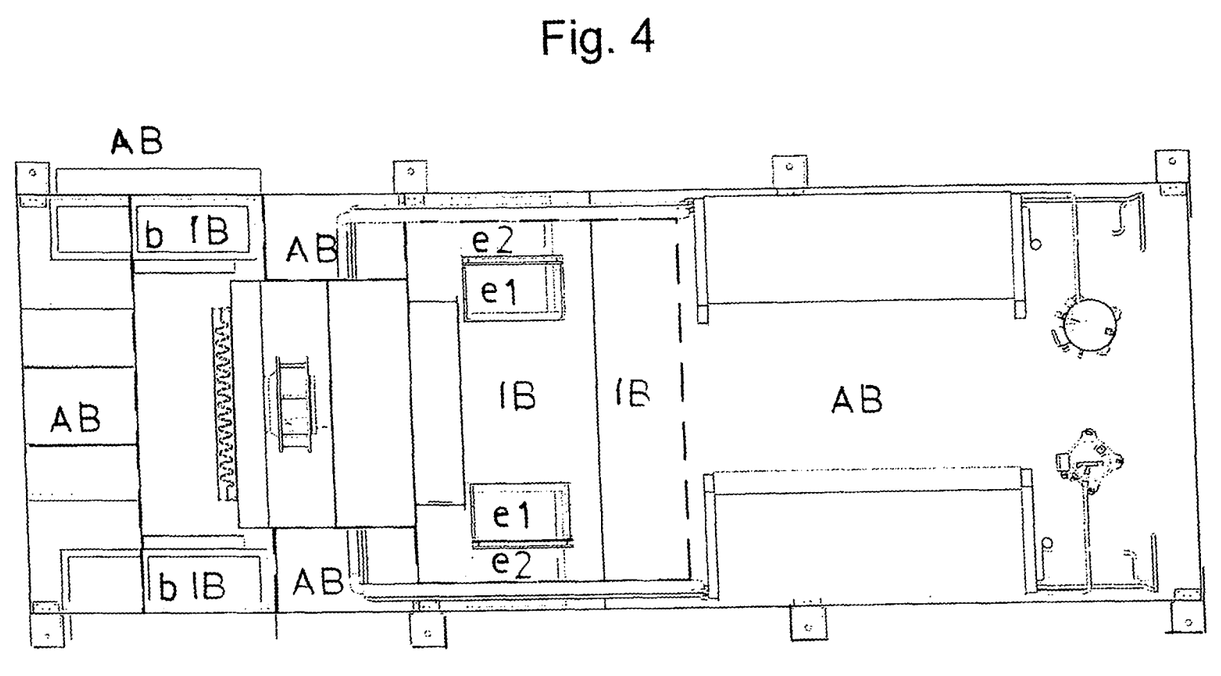
FIG. 4 shows a stylized representation of a third embodiment for arranging assemblies of the air-conditioning system within air-tight ducting.

FIG. 4 shows a modified version of the arrangement shown in FIG. 2. In this variant, the electrical switch box C is also arranged within an air-tight ducting in the housing of the air-conditioning system. Here, too, the air-tight ducting is stylized with a somewhat more strongly drawn and interrupted line contour. Similarly, the reference sign AB denotes the outer environment as viewed from the ducting routing, and the reference sign IB denotes the inner air treatment area as viewed from the ducting routing, wherein the area AB is open to the environment and potential leakage is vented or discharged to the outside, and IB represents the safe inner area in which no leakage is expected inasmuch as the evaporator is designed as a secure evaporator.

Figure 5:
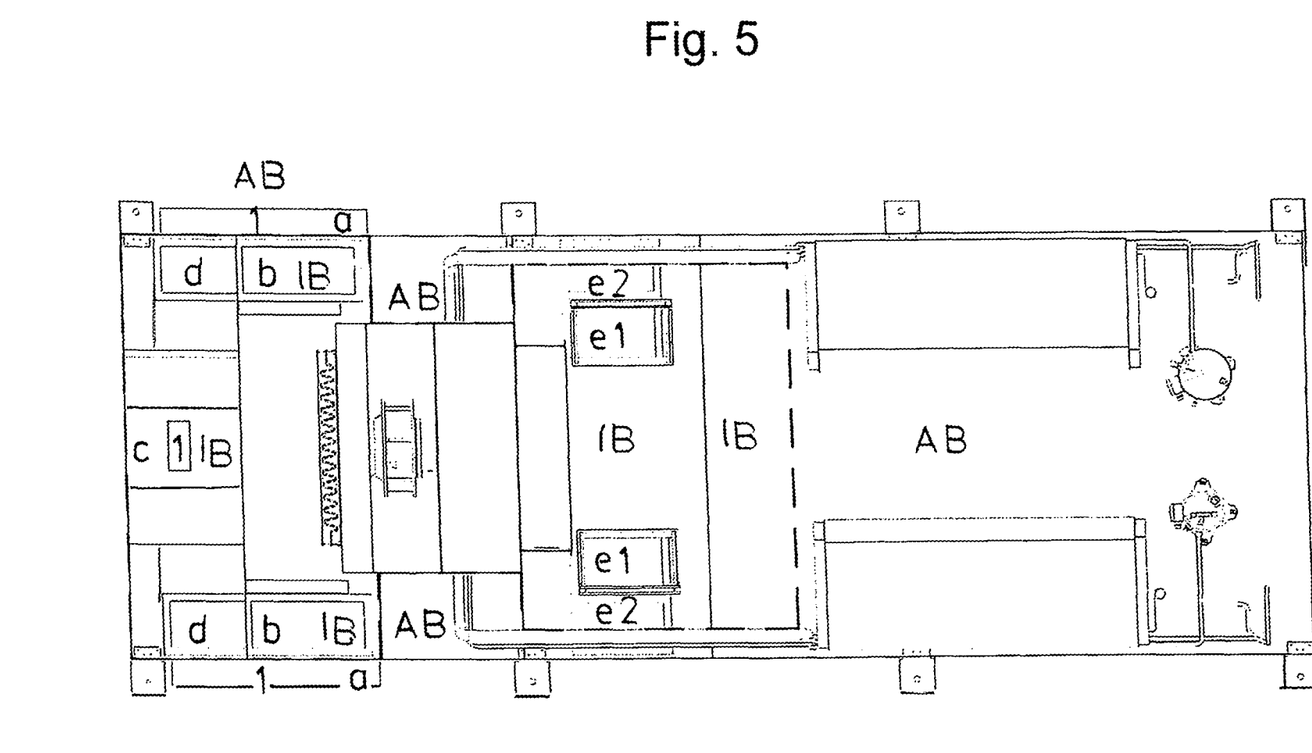
FIG. 5 shows a stylized representation of a fourth embodiment for arranging assemblies of the air-conditioning system within pressure-tight ducting.

FIG. 5 shows an embodiment that when compared to FIG. 4, is further modified, in which here (similar to FIG. 3) the device section A for the outgoing air with the pressure wave valve 1 and its interfaces to the outgoing air intake d and to the outgoing air opening c is also arranged within air- and pressure-tight ducting in the housing of the air-conditioning system. Here too, the air- and pressure-tight ducting is stylized with a somewhat more strongly drawn and interrupted line contour. Similarly, the reference sign AB denotes the outer environment as viewed from the ducting routing, and the reference sign IB denotes the inner air treatment area as viewed from the ducting routing, wherein the area AB is open to the environment and potential leakage is vented or discharged to the outside, and IB represents the safe inner area in which no leakage is expected inasmuch as the evaporator is designed as a secure evaporator.

Figure 6:
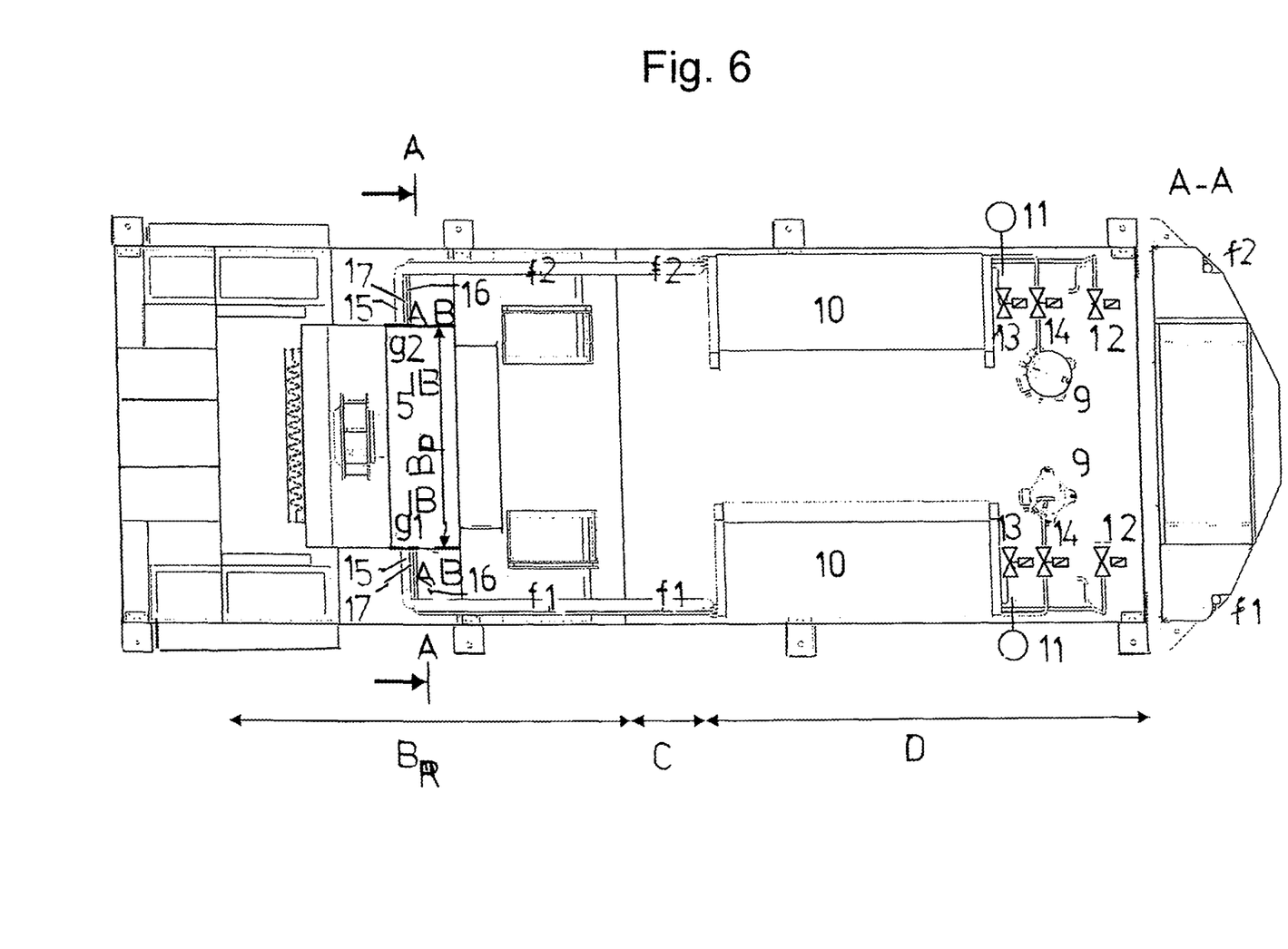
FIG. 6 shows a stylized representation of an example of a concrete design of the refrigerant-carrying line sections of the evaporator in the case of air-tight or pressure-tight ducting designs.

FIG. 6 shows an example of a specific arrangement and design of the refrigerant-carrying line sections of the evaporator 5. Two refrigerant circuit sections, BP (tube bundle package inside evaporator) and BR (area of refrigerant circuit tubing in the air treatment section), as well as the electrical switch box C and the compressor-liquefier unit D are shown in FIG. 6. Interfaces f1 and f2 are provided for enclosed refrigerant lines in sections BR and C and partition walls g1 and g2 are provided for the sealed evaporator. Furthermore, evaporator 5, compressor 9, liquefier 10, suction pressure sensor 11, solenoid valve liquid line 12, solenoid valve suction line 13, optional solenoid valve bypass line 14, suction line 15, liquid line 16 and optional bypass line 17 are all shown as essential components of each refrigeration circuit.

The straight tubes of the evaporator 5, which are delimited by g1 and g2 and located in the 113, are the only components of the refrigeration circuit which are found in the area of the air- or pressure-tight ducting and can be shut off in the event of damage or significant rapid pressure drop (large refrigerant leak whether outside or inside). In so doing a further minimization of risk is achieved. Shut-off is achieved by closing the solenoid valve liquid line 12 as well as the solenoid valves 13 and 14 in the suction line 15 and the bypass line 17. In addition to this and before shutting down the refrigeration circuit, this shut-off area can also be emptied by the "pump out" function. The "pump out" is performed by closing the solenoid valve liquid line 12 and the solenoid valve bypass line 14 while the compressor 9 is running. In so doing, the entire piping connection from the solenoid valve liquid line 12 to the suction side of the compressor 9 is evacuated. In detail, this concerns the liquid line 16 downstream of the solenoid valve liquid line 12 through the areas f1 and f2, then continuing onwards via the piping package of the evaporator (BP) back via the suction line 15 and bypass line 17 through the areas f1 and f2. When a defined suction pressure is reached, the compressor 9 is switched off and the solenoid valve 13 of the suction line 15 is closed. The position of the solenoid valves 12, 13 and 14 is merely given by way of example and can, for example, also be close to the evaporator 5. Expanding upon this and after having shut down and evacuated the refrigeration circuit, the evacuation section can additionally be monitored by a suction pressure sensor 11 located in the evacuation section and a repetition of the "pump out" when a predetermined pressure is reached in the evacuation section. In this case, the increase in pressure is associated with the presence of refrigerant in the evacuated section. This provides additional monitoring of the state of evacuation of the section that can be shut off.

The invention claimed is:

1. An air-conditioning system for a rail vehicle, wherein the air-conditioning system is suitable for using flammable refrigerants of categories A2, A2L, and A3 and is designed for installation on a vehicle roof and at least has equipment sections for an air treatment section, a compressor-liquefier equipment, and an outgoing air section, wherein the outgoing air section at least has first interfaces to an outgoing air intake and to an outgoing air opening, and wherein the air treatment section at least has second interfaces to an outside air intake and to an ambient air intake, as well as to a supply-air blow-out, air filter, an evaporator and supply-air fan, a mixed air flap for ambient air, supply-air flaps, and a heating register, wherein refrigerant-carrying assemblies and components of the air-conditioning system are arranged outside areas of ventilation ducting through which air is supplied to passengers in the vehicle in a separate housing and open to an environment, in that at least the mixed air flap for the outside air or ambient air, the air filter, the supply-air flaps, the supply-air fan, the evaporator, and the heating register of the air treatment section, as well as the second interfaces of to the outside air intake or to the ambient air intake, and the supply-air blow-out are arranged within air-tight or pressure-tight ducting in the housing of the air-conditioning system.

2. The air-conditioning system according to claim 1, wherein refrigerant-carrying line sections of the evaporator are arranged as an only component of a refrigerant circuit in an area of the air-tight or pressure-tight ducting and are designed to be configured to be shut off and evacuated in an expandable and monitored manner.

3. The air-conditioning system according to claim 1, wherein a pressure wave valve of the outgoing air section and the first interfaces to the outgoing air intake and to the outgoing air opening are arranged within the pressure-tight ducting in the housing of the air-conditioning system.

4. The air-conditioning system according to claim 3, wherein an electrical switch box is arranged within the air-tight or pressure-tight ducting in the housing of the air-conditioning system.

5. A vehicle air conditioning system comprising:
a housing;
an air treatment section disposed within the housing, the air treatment section configured to cool air within the housing and including a mixed air flap configured to direct ambient air into the air treatment section, an air filter, an evaporator, a heating register, and a supply-air flap;
an outgoing air section disposed within the housing, the outgoing air section configured to direct the air that is cooled by the air treatment section out from the housing;
a compressor-liquefier unit disposed within the housing; and
an airtight ducting disposed within the housing with the mixed air flap, the air filter, the evaporator, the heating register, and the supply-air flap disposed within the airtight ducting.

6. The vehicle air conditioning system of claim 5, further comprising:
an electrical switch box disposed within the airtight ducting.

7. The vehicle air conditioning system of claim 5, wherein the air treatment section also includes an outside air intake, an ambient air intake, and a supply air discharge, and the mixed air flap, the air filter, the evaporator, the heating register, and the supply-air flap include interfaces to the mixed air flap, the air filter, the evaporator, the heating register, and the supply-air flap.

8. The vehicle air conditioning system of claim 7, wherein the interfaces also are disposed within the airtight ducting.

9. The vehicle air conditioning system of claim 5, wherein the outgoing air section includes a pressure wave valve, an outgoing air opening, an outgoing air intake, and interfaces between the pressure wave valve and each of the outgoing air opening and the outgoing air intake.

10. The vehicle air conditioning system of claim 9, wherein the pressure wave valve, the outgoing air opening, the outgoing air intake, and the interfaces are disposed within the airtight ducting.

11. A vehicle air conditioning system comprising:
a housing;
an air treatment section disposed within the housing, the air treatment section configured to cool air within the housing and including a mixed air flap configured to direct ambient air into the air treatment section, an air filter, an evaporator, a heating register, and a supply-air flap, the air treatment section including an outside air intake, an ambient air intake, and a supply air discharge, wherein the mixed air flap, the air filter, the evaporator, the heating register, and the supply-air flap include interfaces to the mixed air flap, the air filter, the evaporator, the heating register, and the supply-air flap;
an outgoing air section disposed within the housing, the outgoing air section configured to direct the air that is cooled by the air treatment section out from the housing;
a compressor-liquefier unit disposed within the housing; and
an airtight ducting disposed within the housing with the mixed air flap, the air filter, the evaporator, the heating register, the supply-air flap, and the interfaces are disposed within the airtight ducting.

12. The vehicle air conditioning system of claim 11, further comprising:
an electrical switch box disposed within the airtight ducting.

13. The vehicle air conditioning system of claim 11, wherein the interfaces are first interfaces, and the outgoing air section includes a pressure wave valve, an outgoing air opening, an outgoing air intake, and second interfaces between the pressure wave valve and each of the outgoing air opening and the outgoing air intake.

14. The vehicle air conditioning system of claim 13, wherein the pressure wave valve, the outgoing air opening, the outgoing air intake, and the second interfaces are disposed within the airtight ducting.

* * * * *